(12) United States Patent
Yang et al.

(10) Patent No.: US 9,012,351 B2
(45) Date of Patent: Apr. 21, 2015

(54) METHOD FOR CONTINUOUSLY PREPARING METAL OXIDES CATALYST AND APPARATUS THEREOF

(75) Inventors: Yong Yang, Taiyuan (CN); Baoshan Wu, Taiyuan (CN); Jian Xu, Taiyuan (CN); Hongwei Xiang, Taiyuan (CN); Yongwang Li, Taiyuan (CN)

(73) Assignee: SynFuels China Technology Co., Ltd., Huairou District, Beijing (CN)

( * ) Notice: Subject to any disclaimer, the term of this patent is extended or adjusted under 35 U.S.C. 154(b) by 956 days.

(21) Appl. No.: 13/131,107

(22) PCT Filed: Jun. 29, 2009

(86) PCT No.: PCT/CN2009/072514
§ 371 (c)(1),
(2), (4) Date: May 25, 2011

(87) PCT Pub. No.: WO2010/066129
PCT Pub. Date: Jun. 17, 2010

(65) Prior Publication Data
US 2011/0245072 A1 Oct. 6, 2011

(30) Foreign Application Priority Data
Dec. 11, 2008 (CN) .......................... 2008 1 0186615

(51) Int. Cl.
*B01J 23/00* (2006.01)
*B01J 23/02* (2006.01)
(Continued)

(52) U.S. Cl.
CPC ........ *B01J 37/10* (2013.01); *B01J 23/10* (2013.01); *B01J 23/16* (2013.01); *B01J 23/70* (2013.01);
(Continued)

(58) Field of Classification Search
USPC ......... 502/303–305, 311–313, 317, 318, 324, 502/337, 338, 344, 345, 347, 353
See application file for complete search history.

(56) References Cited

U.S. PATENT DOCUMENTS 3,873,469 A * 3/1975 Foster et al. .................. 502/242
4,937,062 A * 6/1990 Jordan et al. ............... 423/592.1
(Continued)

FOREIGN PATENT DOCUMENTS

CN            1113905 A      12/1995
CN            1929918 A      3/2007
(Continued)

*Primary Examiner* — Patricia L Hailey
(74) *Attorney, Agent, or Firm* — McDonnell Boehnen Hulbert & Berghoff LLP

(57) ABSTRACT

A method for continuously preparing a metal oxides catalyst comprises the following steps: dissolving metal materials using nitric acid solution to produce a metal nitrate solution, and also to produce $NO_x$ and water vapor; hydrolyzing the metal nitrate solution by introducing pressurized superheated water vapor into the metal nitrate solution to obtain a slurry of the hydrates of metal oxides as well as acidic gas, the main components of the acidic gas are $NO_2$, NO, $O_2$ and water vapor; filtrating and drying the slurry to obtain the hydrates of metal oxides and/or metal oxides; and then utilizing the obtained hydrates of metal oxides and/or metal oxides as raw materials and preparing the metal oxides catalyst by the conventional method for preparing a catalyst. The $NO_x$ gas produced can be absorbed to produce nitric acid which can be reused. An apparatus used for preparing metal oxides comprises a metal salt solution preparation system, a metal salt solution hydrolysis system, a product preparation system and a nitric acid preparation and recycling use system. The method and the apparatus can achieve continuous production, enclosed circulation and zero release in the whole process and can reduce the cost of production.

15 Claims, 1 Drawing Sheet

(51) Int. Cl.
| | | |
|---|---|---|
| *B01J 23/04* | (2006.01) | |
| *B01J 23/10* | (2006.01) | |
| *B01J 23/32* | (2006.01) | |
| *B01J 23/48* | (2006.01) | |
| *B01J 23/50* | (2006.01) | |
| *B01J 23/70* | (2006.01) | |
| *B01J 23/72* | (2006.01) | |
| *B01J 23/74* | (2006.01) | |
| *B01J 37/10* | (2006.01) | |
| *B01J 23/16* | (2006.01) | |
| *B01J 23/78* | (2006.01) | |
| *B01J 23/80* | (2006.01) | |
| *B01J 23/889* | (2006.01) | |
| *B01J 37/00* | (2006.01) | |
| *B01J 37/03* | (2006.01) | |
| *C01B 13/36* | (2006.01) | |
| *C01B 21/42* | (2006.01) | |
| *C01G 49/00* | (2006.01) | |
| *B01J 35/00* | (2006.01) | |
| *B01J 35/10* | (2006.01) | |

(52) U.S. Cl.
CPC *B01J 23/72* (2013.01); *B01J 23/78* (2013.01); *B01J 23/80* (2013.01); *B01J 23/8892* (2013.01); *B01J 35/0026* (2013.01); *B01J 35/1014* (2013.01); *B01J 35/1019* (2013.01); *B01J 35/1038* (2013.01); *B01J 37/0045* (2013.01); *B01J 37/033* (2013.01); *C01B 13/366* (2013.01); *C01B 21/42* (2013.01); *C01G 49/0018* (2013.01); *C01G 49/0072* (2013.01); *C01P 2006/11* (2013.01); *C01P 2006/12* (2013.01); *C01P 2006/14* (2013.01)

(56) References Cited

U.S. PATENT DOCUMENTS

| | | | |
|---|---|---|---|
| 5,036,037 A | | 7/1991 | Kladnig et al. |
| 5,545,360 A | * | 8/1996 | Yang .................................. 264/9 |
| 6,811,758 B1 | * | 11/2004 | Pickering et al. ............. 423/21.1 |
| 6,908,874 B2 | * | 6/2005 | Woodhead et al. ............... 502/65 |
| 6,974,566 B2 | * | 12/2005 | Sabacky et al. ................ 423/600 |
| 7,713,504 B2 | * | 5/2010 | Sabacky et al. ................ 423/263 |
| 2011/0257008 A1 | * | 10/2011 | Bartholomew et al. ........ 502/407 |

FOREIGN PATENT DOCUMENTS

| | | | | |
|---|---|---|---|---|
| JP | 9077503 A | | 3/1997 | |
| PT | 05-02263 | * | 2/2007 | ............ B01J 23/745 |
| WO | WO 2007/074438 A2 | | 7/2007 | |

\* cited by examiner

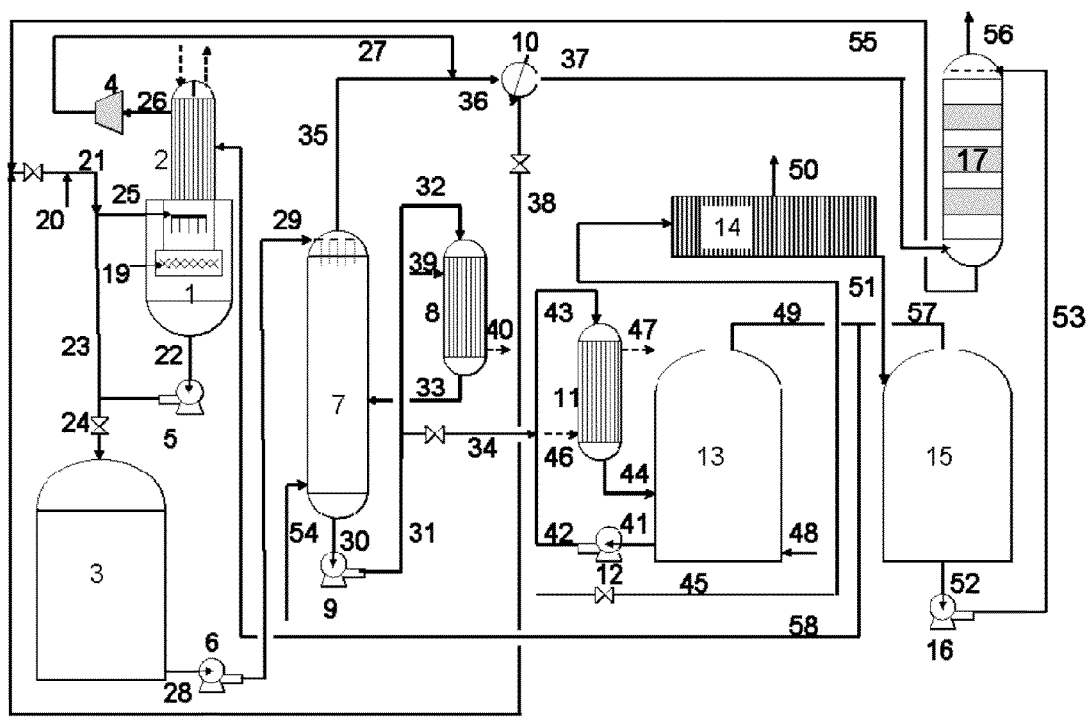

METHOD FOR CONTINUOUSLY PREPARING METAL OXIDES CATALYST AND APPARATUS THEREOF

This application is a US national phase of International Application No. PCT/CN2009/072514 filed on Jun. 29, 2009, which claims priority to Chinese Patent Application No. 200810186615.2, filed Dec. 11, 2008, the disclosure of which are incorporated herein by reference in their entirety.

TECHNICAL FIELD

The present invention relates to the fields of catalyst and material technology, more specifically, it relates to the method and apparatus for preparing metal oxides materials, including the hydrates of metal oxides and/or metal oxides and catalyst. The methods and apparatuses of this invention are especially suitable for preparing catalysts of Fischer Tropsch Synthesis (FTS) (for producing hydrocarbons from syngas) and other metal oxides materials. The production method is a kind of environmentally-friendly and green chemistry method.

BACKGROUND OF THE INVENTION

Metal oxides including transition metal oxides, as the main active phase for most catalytic reactions, generally can provide the required high specific surface area for catalytic reactions, wherein the d and f electron bonding energy level of transition metals are especially suitable for the chemical adsorption and activation of the reactant molecules. Additionally, metal oxides have wide applications in the material field, which is the main component for a variety of nano-powders, coatings and inorganic pigments.

The common methods for obtaining metal oxides are as follows: precipitation, hydrothermal synthesis, inorganic metal salt decomposition (e.g., most commonly, the decomposition of nitrates), organic metal salt decomposition, and explosion methods.

Precipitation (co-precipitation) method, for its operability and controllable preparation conditions, usually is the most important preparation method for obtaining metal oxides in industry and laboratories. Precipitation (co-precipitation) method is to allow the soluble salts of one or several selected metal oxides react with the aqueous solution of alkaline substances under a relative low temperature (<100° C.), an atmospheric pressure and a specific pH, to obtain a precipitate of hydrates of metal oxides, and after further treatment, metal oxide catalyst and other metal oxides materials can be obtained. Metal oxides with a desired specific surface area and a grain size can be obtained by controlling conditions of co-precipitation method. Hence, the method is widely used in preparation of a variety of industrial catalysts and metal oxides materials.

Hydrothermal synthesis method is a commonly used preparation method to prepare mixed metal oxides, molecular sieve and nano-powder at relatively high temperature (>100° C.), pressurized and a specific pH. Depending on various products, different raw materials and operation conditions are selected. It generally needs to be carried out in sealed pressurized container under strictly controlled operation conditions.

Metal salt decomposition method is to directly heat inorganic metal salts or organic metal salts in air or oxygen, and make them decomposed to obtain metal oxides.

Presently, metal oxides catalysts used in chemical industry are mainly prepared with conventional precipitation (co-precipitation) technology, the examples of these metal oxides catalysts are as follows: the high temperature (medium temperature) and low temperature shift iron catalysts used in the industrial process of synthetic ammonia; various copper base catalysts in the industrial process of producing methanol and dimethyl ether (DME); catalysts for synthesizing low carbon alcohols and FT synthesis catalysts for converting syngas to hydrocarbons. Additionally, precipitation (co-precipitation) technology is also widely used in preparing metal oxides pigments, materials, superfine particles and nano-powder processes.

The present invention mainly relates to a production method and application associated with the preparation of FT synthesis catalyst.

Most of the preparation methods for FT synthesis catalysts used in coal-to-liquids (CTL) and gas-to-liquids (GTL) industrial production are the aforementioned precipitation (co-precipitation) method. Currently, a large number of patents and literatures have focused on this method.

U.S. Pat. Nos. 4,617,288 and 4,686,313 of Mobil (USA) disclosed a continuous co-precipitation method to prepare Fe—Cu—K FTS catalyst with low nitrogen content by using iron nitrates, which is suitable for industrially continuous production. In U.S. Pat. No. 4,994,428, a method for preparing co-precipitated Fe—Cu—K catalyst and synthesizing hydrocarbon was disclosed, and the obtained hydrocarbon contains more than 90% C5+. U.S. Pat. No. 6,844,370 of Sasol Technology Ltd. also disclosed a catalyst preparation method for a precipitated Fe—Cu—K FTS catalyst without binders, which is suitable for hydrocarbon synthesis in high temperature fluidized bed. U.S. Pat. No. 5,504,118 and CN1113905 of Rentech disclosed a FTS iron base catalyst preparation method used in slurry bed reactor, wherein the nitrates were obtained by dissolving iron and copper with nitric acid, followed by co-precipitation with ammonia, filtrated and washed, then adding potassium carbonate solution, preparing into slurry, and finally granulating by spray-drying. U.S. Pat. No. 6,787,577 of Chevron (USA) disclosed a method for catalyst preparation using co-precipitation of organosilicon and iron salt and its application in FTS. U.S. Pat. No. 5,100,556 of Exxon (USA) disclosed a catalyst preparation method of precipitated Fe—Zn—Cu—K catalyst and its application in FTS, wherein the Fe/Zn mixed nitrates were co-precipitated with ammonia. This method improved the activity and stability of the catalyst and facilitated the production of α-olefins. Patent Nos. CN1600421, CN1600420, CN1817451 and CN1695804 of Shanghai Yankuang Energy R&D Co. Ltd. also mentioned an iron catalyst preparation method by co-precipitation of iron nitrates.

Multiple patents such as CN1463794, CN1597105, CN1395993, CN1583259, CN1562471, CN1463793, CN1562476 and CN1395992 of Synfuels China Co. Ltd. disclosed a series of catalysts preparation method including co-precipitation of iron salts for preparation of Fe/Cu series catalysts and Fe/Mn series catalysts and their applications in FTS. Also, Sasol (South Africa) in its Chinese patent CN1451035 referred to a method of iron nitrate precipitation for FTS catalyst preparation.

The disadvantages of the current precipitation method lies in the following: the generation of a large amount of waste liquid and ammonia nitrate solid; the huge quantity of waste liquid to be treated, especially the explosive properties of the obtained solid ammonia nitrate which brings about some degree of danger, will results in serious environmental issues. In this method, the cost for handling the waste liquid and waste is relatively high, which makes the environment protection issue become an obstacle to the development of catalyst production.

The molecular sieve type catalysts and some oxides carriers used in the petrochemical industry are prepared with the widely adopted hydrothermal reaction method, and this method is also adopted by more metal oxides powders, such as those described in U.S. Pat. No. 5,913,175, CN1558426 and so on. The hydrothermal method is generally carried out in a sealed pressurized container, and the operation conditions are strictly controlled, otherwise, the products with the expected properties cannot be obtained.

Additionally, it is generally difficult to obtain metal oxides materials with uniform particles using thermal hydrolysis method of inorganic metal salts or organic metal salts solution; in addition, it is very difficult to uniformly disperse the additives.

The present invention discloses a green method for preparing hydrates of metal oxides, metal oxides materials and catalysts, which integrates the atmospheric precipitation (co-precipitation) method and hydrothermal reaction method. The method overcomes the drawbacks of the regular hydrothermal reaction method, namely the severe reaction conditions and the requirement of performing the reaction in a sealed container; the method also overcomes the problems of the large consumption of water due to the introduction of one or more chemical reagents and the generation of a large amount of waste water and gas in the atmospheric co-precipitation method. The whole process completely achieves continuous production, enclosed circulation and zero release. The method of the present invention can be widely used in preparation of hydrates of metal oxides, metal oxides materials and catalysts which are used in a variety of chemical industry processes, specifically suitable for preparation of FTS catalyst for converting syngas to hydrocarbons, thus accomplishing the present invention.

SUMMARY OF THE INVENTION

One objective of the present invention is to provide a method for preparing metal oxides catalyst, wherein the method includes preparing hydrates of metal oxides and/or metal oxides firstly; using the above-mentioned hydrates of metal oxides and metal oxides as raw materials to prepare a catalyst containing the metal oxides according to the conventional catalyst preparation methods; the method is characterized in that the hydrates of metal oxides and/or metal oxides are prepared according to the following method:

(1) Metal salt solution preparation step: dissolving one or more kinds of transition metal materials in nitric acid solution to produce a metal nitrate solution, and also to produce $NO_2$ and water vapor;

(2) Metal salt solution hydrolysis step: heating the obtained metal nitrate solution and introducing pressurized superheated water vapor to perform hydrolysis to obtain acidic gas and a slurry of hydrates of metal oxides, wherein main components of the acidic gas are $NO_2$, $NO$, $O_2$ and water vapor; and (3) Product preparation step: the slurry of hydrates of metal oxides is filtered to obtain the hydrates of metal oxides and a filtrate; the hydrates of metal oxides are dried to obtain the corresponding hydrates of metal oxides and/or metal oxides.

By the method of the present invention, the hydrates of metal oxides and/or metal oxides and catalysts prepared thereby can be obtained. In the description of the present invention, solid product can be prepared from the obtained slurry of hydrates of metal oxides by filtrating and drying.

Depending upon drying method and/or drying temperature, the resultant product is either still the hydrates of metal oxides (e.g. drying at a temperature of 100° C. or lower), or metal oxides per se (e.g. drying at a temperature of 100° C. or higher). During actual operation, it is likely to obtain mixtures of hydrates of metal oxides and metal oxides with different weight ratios. For the convenience of description, the hydrates of metal oxides and/or metal oxides (probably hydrates of metal oxides, metal oxides or the mixture thereof) obtained from the above-mentioned method in the present invention are also termed as metal oxides materials or catalyst precursors.

The method according to the present invention for preparation of hydrates of metal oxides and/or metal oxides relates to the following two reactions:

1. The dissolving reaction of transition metal material and acid solution (taking $HNO_3$ as an example):

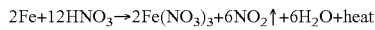

As the raw materials for the above reaction, the acid solution is an aqueous solution of nitric acid with a concentration of 10-55 wt %, preferably 20-50 wt %;

2. Metal oxides precursors are obtained by the hydrolysis step from the metal salt solution obtained in the metal salt solution preparation step, which relates to the following reaction (taking iron nitrate as an example):

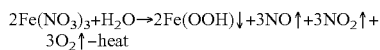

The metal salt solution is the metal salt solution obtained from the above dissolving reaction. In order to realize recycling use, it is preferable that the metal salt solution is a mixed solution of the metal salt solution obtained from the metal salt solution preparation step and a part of the filtrate from the slurry filtrating system.

Another important feature to differentiate the present method from that of the prior art is that the nitric acid preparation and recycling use step is also included in the method for preparing the hydrates of metal oxides and/or metal oxides, wherein the nitric acid preparation and recycling use step includes: collecting the gas produced from the metal salt solution preparation step and the acidic gas from the metal salt solution hydrolysis step, then compress the $NO_2$ component and absorb the same in the absorption tower to obtain nitric acid solution; or collecting the gas from the metal salt solution preparation step and the acidic gas from the metal salt solution hydrolysis step, followed by compression and condensation to obtain the acid solution, and the acid solution is returned to the metal salt solution preparation step for recycling use; the $NO_2$ contained in the uncondensed gas is absorbed in the absorption tower to obtain the nitric acid solution, wherein the absorption liquid is the acid-containing filtrate from the filtrating separation of the hydrates of metal oxides precipitate; the nitric acid solution obtained is returned to the metal salt solution preparation step for recycling use.

In the above method of the present invention, the used metal raw materials are transition metal materials. The term "transition metal" used in the present invention refers to relatively broad concept of "transition elements" in the chemistry field, namely, those elements with their valence electrons sequentially filled in the next-outmost layer, namely d-orbital. The elements include the chemical elements from IIIB group to VIII group, lanthanide elements, actinide elements, IB group elements and IIB group elements in the periodic table. Preferably, the metal materials used in the present invention are one or more elements selected from the group consisting of V, Cr, Mn, Fe, Co, Ni, Cu, Y, Zr, Nb, Mo, Ag, La and Ce; more preferably, the metal materials are one or more elements selected from the group consisting of Cr, Mn, Fe, Co, Ni, Cu, Zr, Nb and Mo. Specifically preferably, the metal materials used are materials in sheets, rods or powder forms.

In the present invention, when metal elements are mentioned, the terms "transition metal" or "metal" have the same meaning.

Specifically, the metal salt solution preparation step of the step (1) is performed under atmospheric pressure at a temperature range from room temperature to 95° C. to obtain the metal nitrate solution together with $NO_x$ and water vapor; wherein the concentration of the nitric acid solution added is 10-55 wt %, and the concentration of the produced nitrates solution is 10-50 wt %; and/or The metal salt solution hydrolysis step of the step (2) is to introduce the pressurized superheated water vapor into the reactor to hydrolyze the metal nitrate solution obtained from the step (1) at a reaction temperature of 80-250° C. with a pressure of 2-50 bar; a slurry containing hydrates of metal oxides precipitate and acidic gas are produced, and main components of the acidic gas are $NO_2$, NO, $O_2$ and water vapor; wherein the temperature of the pressurized superheated water vapor introduced is 120-260° C. and the pressure thereof is 3-50 bar; and/or The product preparation step of the step (3) is to subject the slurry obtained from the step (2) to some conventional treatments including pressurizing, cooling and acidic gas removing, and then the slurry is separated by filtrating to obtain the hydrates of metal oxides precipitate and filtrate; the solid content of the hydrates of metal oxides precipitate product (e.g. filter cake) is 10-50 wt %; the desired hydrates of metal oxides and/or metal oxides are obtained after drying the precipitate.

The preparation method of the hydrates of metal oxides and/or metal oxides according to the present invention comprises the following steps:

(1) Dissolving one or more kinds of metal materials in a nitric acid solution in a reactor under atmospheric pressure at a reaction temperature from room temperature to 95° C., preferably from room temperature to 80° C. to obtain the metal nitrate solution together with $NO_2$ and water vapor; wherein the concentration of the nitric acid solution used is 10-55 wt %, preferably 20-50 wt % and the concentration of the metal nitrate solution produced is 10-50 wt %, preferably 15-45 wt %;

(2) Introducing the pressurized superheated water vapor into the reactor of the metal salt solution hydrolysis reaction, in which the hydrolysis reaction of the metal nitrate solution obtained from the step (1) is performed; the reaction temperature is 80-250° C. and the pressure is 2-50 bar, preferably, the reaction temperature is 100-200° C. and the pressure is 3-25 bar; the slurry containing hydrates of metal oxides precipitate together with acidic gas are produced, and main components of the acidic gas are $NO_2$, NO, $O_2$ and water vapor;

Wherein, the temperature of the introduced pressurized superheated water vapor is 120-260° C. with a pressure of 3-50 bar; preferably, the temperature of the introduced pressurized superheated water vapor is 130-250° C. with a pressure of 4-40 bar.

(3) Subjecting the slurry obtained from the step (2) to some conventional treatments including pressurizing, cooling and acidic gas removing, and then the slurry is separated by filtrating to obtain a filtrate and a filter cake containing hydrates of metal oxides precipitate, the solid content of the hydrates of metal oxides precipitate ranges 10-50 wt %, preferably 15-45 wt %; the desired hydrates of metal oxides and/or metal oxides are obtained after drying the precipitate.

More specifically, the concentration of the metal nitrate solution obtained in the step (1) is 10-50 wt %, preferably 15-45 wt %; and the reaction temperature of the nitrate solution preparation is from room temperature to 95° C., preferably from room temperature to 80° C., the concentration of the nitric acid solution used is 10-55 wt %, preferably 20-50 wt %.

The hydrates of metal oxides precipitate product (e.g. filter cake) obtained from filtration of the slurry in the step (3) has a solid content percent (or solid content) of 10-50 wt %, preferably 15-45 wt %.

The filtrate and the hydrates of metal oxides precipitate are obtained by filtering the slurry of hydrates of metal oxides, and a part of the obtained filtrate is reused as raw materials of the metal salt solution hydrolysis system; another part of the obtained filtrate is used as absorption liquid for $NO_2$ absorption to make nitric acid.

In the present invention, the filtrate and the hydrates of metal oxides precipitate are obtained by filtrating the slurry of hydrates of metal oxides. The obtained precipitate is then dried to obtain solid metal oxides material in the form of dry filter cake. According to the conventional techniques in this field, the metal oxides material can be processed into metal oxides nano-powder or other forms suitable for applications.

The method of the present invention further comprises nitric acid preparation and recycling use step, wherein the nitric acid preparation and recycling use step includes: collecting the gas produced from the metal salt solution preparation step and the acidic gas from the metal salt solution hydrolysis step, then compress the $NO_2$ component and absorb the same in the absorption tower to obtain nitric acid solution, and the absorption liquid is the acid-containing filtrate obtained from the filtrating separation of the hydrates of metal oxides precipitate, and the nitric acid solution obtained can be returned to the metal salt solution preparation step for recycling use. Alternatively, the nitric acid preparation and recycling use step includes: collecting the gas from the metal salt solution preparation step and the acidic gas from the metal salt solution hydrolysis step, followed by compression and condensation to obtain the acid solution, and the acid solution is returned to the metal salt solution preparation step for recycling use; the $NO_2$ contained in the uncondensed gas is absorbed in the absorption tower to obtain the nitric acid solution, and the nitric acid solution obtained is reused as a raw material of the metal salt solution preparation step. The reaction temperature for the acidic gas absorption inside the absorption tower to produce nitric acid solution is 3-50° C., preferably 10-40° C.; and the pressure for that is 2-20 bar, preferably 3-15 bar.

More preferably, the hydrates of metal oxides and/or metal oxides preparation method in the present invention include the following steps (1) to (3) and the optional step (4):

(1) Metal salt solution preparation step: dissolving one or more kinds of metal materials in nitric acid solution in a reactor under atmospheric pressure at a reaction temperature from room temperature to 80° C. to obtain the metal nitrate solution together with $NO_2$ and water vapor; wherein the concentration of the nitric acid solution used is 20-50 wt % and the concentration of the metal nitrate solution produced is 15-45 wt %;

(2) Metal salt solution hydrolysis step: introducing the pressurized superheated water vapor with a temperature of 130-250° C. and a pressure of 4-40 bar into the reactor of the metal salt solution hydrolysis reaction, in which the hydrolysis reaction of the metal nitrate solution obtained from the step (1) is performed; the reaction temperature is 100-200° C. and the pressure is 3-25 bar;

the slurry containing hydrates of metal oxides precipitate together with acidic gas are produced, and main components of the acidic gas are $NO_2$, $NO$, $O_2$ and water vapor;

(3) Product preparation step: subjecting the slurry obtained from the step (2) to some conventional treatments including pressurizing, cooling and acidic gas removing, and then the slurry is separated by filtrating to obtain a filtrate and a filter cake containing hydrates of metal oxides precipitate, the solid content of the hydrates of metal oxides precipitate ranges 15-45 wt %; the desired hydrates of metal oxides and/or metal oxides are obtained after drying the precipitate; and (4) Nitric acid preparation and recycling use step: collecting the gas from the metal salt solution preparation step and the acidic gas from the metal salt solution hydrolysis step, followed by compression and condensation to obtain an acid solution, and the acid solution is returned to the metal salt solution preparation step for recycling use; the $NO_2$ contained in the uncondensed gas is absorbed in the absorption tower to obtain a nitric acid solution, and the absorption liquid is the filtrate obtained from the filtrating separation of the hydrates of metal oxides precipitate, and the nitric acid solution obtained can be returned to the metal salt solution preparation step for recycling use.

The present invention has a special procedure of nitric acid preparation and recycling use, wherein the solvent of the nitric acid solution used in step (1) of the hydrates of metal oxides and/or metal oxides preparation method is mainly the nitric acid solution obtained from the nitric acid preparation and recycling use system, preferably a small amount of acid solution is added at intervals to the acid reaction system to maintain the concentration of acid solution in the metal salt solution preparation step. Therefore, the sources of the nitric acid solution in the step (1) include:

(1) The acid solution obtained by condensing;
(2) The nitric acid prepared from the $NO_2$ in the uncondensed gas that is absorbed in the absorption tower; and
(3) Fresh nitric acid added to maintain the concentration of the nitric acid solution.

Specifically, the sources of the nitric acid of the step (1) come from:

(1) The acid solution obtained by compression and condensation of the gas from the metal salt solution preparation step and the acidic gas from the metal salt solution hydrolysis step;
(2) The nitric acid prepared by absorbing $NO_2$ in the absorption tower with the absorption liquid, the $NO_2$ is contained in the uncondensed gas after the compression and condensation of the gas from the metal salt solution preparation step and the acidic gas from the metal salt solution hydrolysis step; and
(3) Fresh nitric acid added to compensate an insufficient of nitric acid.

The hydrates of metal oxides and/or metal oxides per se prepared by the method of the present invention can be used as materials for a variety of metal oxides catalyst production or as chemical industry raw materials in chemical and other fields. Preferably, the hydrates of metal oxides and/or metal oxides prepared by the method of the present invention are especially suitable for preparing FTS catalysts, wherein the compositions of the FTS catalyst and processing methods regarding shaping, drying and roasting can be carried out following the conventional procedures of FTS catalyst preparation.

When the metal oxides material is obtained as filter cake from the present invention, the catalyst preparation method in the present invention comprises the steps as follows: directly drying and shaping the filter cake into catalyst; or preparing the filter cake into a slurry again and adding other additives to prepare the catalyst by drying and shaping; or adding a catalyst additive to the metal nitrate solution obtained from step (1), followed by metal salt solution hydrolysis step and the subsequent steps, from which the desired catalyst as final product is obtained.

When the hydrates of metal oxides and metal oxides products from the present invention are used to prepare FTS catalyst, the additives used are alumina sols, silica sols, organosilicons, molecular sieves, organic acids or inorganic salts, wherein the inorganic salts include nitrates or carbonates of IA and IIA metals.

The advantage of the present invention for catalyst preparation is that no additional chemical reagent is added. Under the action of superheated water vapor, the transition metal salts are completely decomposed into the precursors of the transition metal oxides, and a variety of catalysts and functional materials based on the transition metal oxides may be prepared. Because no chemical reagents such as precipitants are needed in the method, costs on corresponding industrial raw materials and large amount of washing apparatuses as well as distilled water for washing can be saved; it can also simultaneously avoid impurities introduced by the auxiliary chemical additives like precipitants in the final product which can influence the properties of the materials such as catalyst. Thus, another feature of this method is that it is green and environmentally friendly. It achieves the target of zero release. The method also achieves continuous production of the whole process and the enclosed circulation of water and acidic gas ($NO_x$ and water vapor).

Another objective of the present invention is to provide an apparatus for preparing the above-mentioned hydrates of metal oxides and/or metal oxides, the apparatus comprises:

(1) A metal salt solution preparation system, for dissolving metal materials in nitric acid to obtain a metal nitrate solution;
(2) A metal salt solution hydrolysis system, for thermal hydrolysis of the metal nitrate solution under the action of pressurized superheated water vapor to obtain a slurry of hydrates of metal oxides; and
(3) A product preparation system, for preparing the hydrates of metal oxides and/or metal oxides.

Furthermore, the apparatus according to the present invention also include nitric acid preparation and recycling use system, which is used for converting the gaseous product into nitric acid solution, and the gaseous product is obtained from the metal salt solution preparation step and the metal salt solution hydrolysis step, and the nitric acid solution is returned to the metal salt solution preparation system for recycling use.

Preferably, the apparatus for preparing the hydrates of metal oxides and/or metal oxides include the nitric acid preparation and recycling use system.

Specifically, in the apparatus according to the present invention, the metal salt solution preparation system includes a metal salt solution preparation reactor and its ancillary facilities; the ancillary facilities comprise inlet and outlet systems and a cooling system; wherein the inlet and outlet systems include a recycling system of the nitric acid solution which is one of the raw materials; the metal salt solution preparation system can effectively control the progress of the metal dissolution reaction, balance acid supply of the reaction and realize the continuous production of the reaction. The ancillary facilities are further equipped with a cooling system which uses the cold acid gas from the downstream steps as heat exchange medium and can effectively control the temperature of the dissolution reaction without additional cooling source.

In the apparatus according to the present invention, the metal salt solution hydrolysis system comprises a metal salt solution hydrolysis reactor and its ancillary system, the ancillary system includes a hot slurry recycling heating system, which can participate in the temperature control of the decomposition reaction, it also can control the solid content of the effluent slurry, and at the same time realize continuous production of the process.

In the metal salt solution hydrolysis reactor, the reaction temperature can be controlled via the following methods:
  (1) Introducing pressurized superheated water vapor into the reactor and heating, preferably, the temperature of the pressurized superheated water vapor is 120-260° C., and the pressure thereof is 3-50 bar, more preferably, the temperature is 130-250° C., and the pressure is 4-40 bar.
  (2) Providing a sprayer on the top of the reactor and cooling by spraying; and
  (3) Controlling the temperature of the reactor by the hot slurry recycling heating system, and controlling the solid content of the effluent slurry as well.

In the apparatus of the present invention, the product preparation system comprises a cold slurry recycling system, a slurry filtration system, a filtrate storage tank, and a drying and shaping system, wherein the cold slurry recycling system is used for cooling down the hot slurry.

Because the present invention includes the hot slurry recycling heating system and the cold slurry recycling system, the aging process controlling of the precipitate in the slurry can be achieved by recycling and mixing of the cold slurry and the hot slurry; meanwhile, it makes the storage, transfer of the slurry continuous.

In the apparatus of the present invention, the slurry filtration system includes a plate-and-frame press filter and its ancillary facilities. Filtering the slurry of hydrates of metal oxides cooled down by the cold slurry recycling system with the plate-and-frame press filter to obtain the corresponding hydrates of metal oxides precipitate. A part of the filtrate is reused as raw materials of the metal salt solution hydrolysis system; another part of the filtrate is used as the absorption liquid in the acidic gas recovery system for the absorption of the uncondensed acidic gas.

The precipitate product separated from the slurry filtration system has a solid content percentage (or solid content) of 10-50 wt %, preferably 15-45 wt %.

In the apparatus of the present invention, the nitric acid preparation and recycling use system comprises an acidic gas condensation and compression system and an acidic gas recovery system, wherein the acidic gas recovery system includes absorption tower and its ancillary facilities.

In order to enhance the recovery rate of the acidic gas and make the $NO_x$ content in discharged gas meet the national standards on gas emissions, the acidic gas recovery system can be equipped with two or more absorption towers in series.

Preferably, the apparatus for preparing the hydrates of metal oxides and/or metal oxides includes:
  (1) A metal salt solution preparation system, which includes a metal salt solution preparation reactor as well as inlet and outlet systems and cooling system as its ancillary facilities;
  (2) A metal salt solution hydrolysis system, which includes a metal salt solution hydrolysis reactor and a hot slurry recycling heating system;
  (3) A product preparation system, which includes a cold slurry recycling system, a slurry filtration system, a filtrate storage tank, and a drying and shaping system; and
  (4) A nitric acid preparation and recycling use system, which includes an acidic gas condensation and compression system and an acidic gas recovery system.

In comparison to the prior art, the method and apparatus according to the present invention have the following advantages:
  (1) A feature of the metal oxides preparation method in the present invention is that it combines the advantages of the atmospheric precipitation (co-precipitation) method and the hydrothermal reaction method, which avoids the selection of suitable decomposable raw materials as metal source in the conventional hydrothermal reaction method, and overcomes the shortcomings of the non-uniformity of the dispersion of different kinds of hydrates of metal oxides precipitate due to the improper solution acidity control in the conventional co-precipitation method; highly dispersed metal oxides precipitate is achieved by adjusting the reaction temperature, the pressure and the amount of the pressurized superheated water vapor; it can also achieve the co-precipitation of multiple kinds of hydrates of metal oxides.
  (2) Another feature of the metal oxides preparation method in the present invention also includes the control of the crystallization speed of the precipitate via appropriate circulation of part of the slurry to effectively control the rate of hydrolysis.
  (3) Another feature of the metal oxides preparation method in the present invention is its wide application, which can be used in almost all the preparations of metal oxides or catalyst via precipitation (co-precipitation) method that makes use of nitrates as raw materials, and also can be used in part of the preparations of metal oxides and catalysts via hydrothermal reaction method.
  (4) Another feature of the metal oxides preparation methods in the present invention is its economical property. On one hand, it saves a large amount of raw materials such as precipitant and at the same time avoids the negative influence on catalyst performance and lifetime due to the introduction of impurities by the precipitant in the co-precipitation method; on the other hand, it avoids the use of a large amount of washing facilities and distilled water (or de-ionized water) for washing, which significantly reduces the construction investment and operation cost of the catalyst production plant.
  (5) Another feature of the metal oxides preparation method in the present invention is its superior environmentally-friendly property. The whole operation method is continuous and totally enclosed. The acidic gas ($NO_x$ and water vapor) from the production process are totally absorbed for acid production, while the waste water in the production process is reused to achieve the zero release of gas and waste water materials. Hence it is green and environmentally-friendly.
  (6) Another feature of the metal oxides preparation method in the present invention is its superior energy efficiency due to the adoption of crossed heat exchange method, which dramatically reduces the energy consumption in production.
  (7) Another feature of the metal oxides preparation method in the present invention is that there is no regional limit in the plant location selection. Previously, the location of the production plant for the preparation of metal oxides catalysts and materials is required to be close to water resource and chemical raw materials base, while the adoption of the present preparation method makes the plant location selection in the region that is relatively lack of water resource possible.

DESCRIPTION OF THE DRAWINGS

FIG. 1 shows the process flow scheme of an embodiment of the present invention for continuous preparation of the metal oxides precursors;

Wherein the relevant major apparatuses includes:

1 reactor
2 cooling condenser
3 salt solution intermediate storage tank
4 low pressure acidic gas compressor
5 acid solution recycling pump
6 salt solution pressurized transfer pump
7 hydrolysis reactor
8 salt solution vapor heater
9 slurry recycling pump
10 acidic gas cooling condenser
11 hot slurry cooler
12 cold slurry recycling pump
13 cold slurry intermediate storage tank
14 plate-and-frame press filter
15 filtrate storage tank
16 filtrate pressurized transfer pump
17 acidic gas pressurized absorption tower

DETAILED DESCRIPTION OF THE INVENTION

Detailed explanations on the apparatus and the method of the present invention are given hereinafter in combination with the attached drawings.

In the apparatus according to the present invention, the metal salt solution preparation system includes a metal salt solution preparation reactor 1 and its ancillary facilities, the ancillary facilities includes inlet and outlet systems and a cooling system, wherein the feedings of the solvent (nitric acid) in the metal solution preparation system comprises:

(1) a small amount of nitric acid solution 20 for compensation;
(2) the nitric acid solution 55 from the bottom of the acidic gas pressurized absorption tower 17; and
(3) the nitric acid solution 38 from the acidic gas cooling condenser 10.

Because the metal salt solution preparation reactor 1 is equipped with the ancillary solution recycling system, it can effectively control the progress of the metal dissolution reaction, balance acid supply of the reaction and realize the continuous production of the reaction.

The metal salt solution preparation reactor 1 is also equipped with a cooling system, which uses the cold acidic gas from the downstream steps as heat exchange medium without any other cold source, and can achieve effective control of the temperature of the dissolution reaction.

In the apparatus of the present invention, the metal salt solution hydrolysis system comprises: a metal salt solution hydrolysis reactor 7 and a hot slurry recycling heating system as its ancillary, wherein the hot slurry recycling heating system includes a slurry recycling pump 9 and a vapor heater 8, wherein the heat source for the vapor heater 8 is the pressurized superheated water vapor with a temperature of 120-260° C. and a pressure of 3-50 bar, preferably with a temperature of 130-250° C. and a pressure of 4-40 bar.

Wherein the reaction temperature inside the metal salt solution hydrolysis reactor 7 can be controlled via the following methods:

(1) Introducing pressurized superheated water vapor into the reactor 7 and heating;
(2) Providing a sprayer on the top of the reactor and cooling by spraying; and
(3) Controlling the temperature of the reactor by the hot slurry recycling heating system, wherein the method to control the temperature is: extracting a part of the hot slurry 34 from the reactor with the slurry recycling pump 9 and heating it up in the vapor heater 8 before introduction into the reactor.

The metal salt solution hydrolysis system in the present invention is equipped with a hot slurry recycling heating system, which controls the temperature of the hydrolysis reaction, and also controls the solid content of the effluent slurry, and realizes continuous production of this process.

Wherein the reaction temperature of the metal salt solution hydrolysis reactor 7 is controlled via the following methods:

(1) Introducing pressurized superheated water vapor with a temperature of 130-250° C. and a pressure of 4-40 bar into the reactor 7 and heating;
(2) Providing a sprayer on the top of the reactor and cooling by spraying; and
(3) Controlling the temperature of the reactor by extracting a part of the hot slurry 34 from the reactor with the slurry recycling pump 9 and heating it up in the vapor heater 8 before introduction into the reactor, and controlling the solid content of the effluent slurry.

Additionally, the reaction degree of the decomposition reaction may also be controlled by extracting a part of the hot slurry 34 from the reactor with the slurry recycling pump 9 in the hot slurry recycling heating system.

In the apparatus of the present invention, the product preparation system comprises a cold slurry recycling system, a slurry filtration system, a filtrate storage tank 15 and a drying system, wherein the cold slurry recycling system for cooling the hot slurry includes a slurry recycling pump 9, a cold slurry recycling pump 12, a hot slurry cooler 11 and a cold slurry storage tank 13.

Wherein the hot slurry cooling process is as follows: extracting a part of hot slurry 34 from the reactor with the slurry recycling pump 9 and mix it with the cold slurry 42 introduced by the cold slurry recycling pump 12 of the cold slurry recycling system to cool the hot slurry down, which is further cooled in the hot slurry cooler 11; the cold slurry 44 formed is transferred to the cold slurry storage tank 13 for later use, optionally, air is introduced at the bottom of the cold slurry storage tank 13, which can cool down the hot slurry and simultaneously facilitates the removal of acidic gas in the slurry.

Because of the installation of the hot slurry recycling heating system and cold slurry recycling system in the present invention, the aging process controlling of the precipitate in slurry and the continuous slurry storage and transfer can be realized by mixing and recycling of the cold slurry and the hot slurry.

In the apparatus of the present invention, the slurry filtration system comprises a plate-and-frame press filter 14 and its ancillary facilities, wherein the corresponding hydrates of metal oxides precipitate is obtained after filtration in the plate-and-frame press filter 14 using the hydrates of metal oxides cooled down by the cold slurry recycling system; a part of the filtrate 51 is reused as the raw materials in the metal salt solution hydrolysis system, another part of the filtrate is used as absorption liquid in the acidic gas recovery system for absorbing the uncondensed acidic gas.

The solid content percentage (or solid content) of the precipitate product from the slurry filtration system is 10-50 wt %, preferably 15-45 wt %. The filtrate separated in the slurry filtration system is completely recovered and stored in the filtrate storage tank, wherein a part of the filtrate is reused as raw materials in the metal salt solution hydrolysis system, another part of the filtrate is used as absorption liquid for $NO_2$ absorption to prepare nitric acid.

In apparatus of the present invention, the nitric acid preparation and recycling use system comprises:

(1) An acidic gas condensation and compression system, which includes a cooling condenser 2 on the top of the reactor 1, and a gas compressor 4 for $NO_2$ compressing and an acidic gas cooling condenser 10; and (2) An acidic gas recovery system, which includes an absorption tower 17 and its ancillary facilities.

Wherein the acidic gas condensation and compression system comprises an acidic gas cooling condenser with its separated liquid products participates in the nitric acid recycling reaction. The acidic gas ($NO_2$) is reused in the acidic gas recovery system. The $NO_2$ gas and water vapor in the whole process is recovered via the operation of the acidic gas condensation and compression system. The pressure in the absorption tower is 2-20 bar, preferably 3-15 bar.

In order to enhance the acidic gas recovery efficiency and make the $NO_x$ content in discharged gas meet the national standards on $NO_x$ emission, the acidic gas recovery system can be equipped with two or more absorption towers in series.

As shown in FIG. 1, the main parts according to the present invention for hydrates of metal oxides and metal oxides preparation methods comprise: the reactor 1 for preparing transition metal salt solution, the cooling condenser 2 for controlling the temperature of the reactor, the salt solution intermediate storage tank 3, the low pressure acidic gas compressor 4, the acid solution recycling pump 5, the salt solution pressurized transfer pump 6, the transition metal salt solution hydrolysis reactor 7, the vapor heater 8 for salt solution recycling use of the hydrolysis reactor, the slurry recycling pump 9, the acidic gas cooling condenser 10, the hot slurry cooler 11, the cold slurry recycling pump 12, the cold slurry intermediate storage tank 13, the plate-and-frame press filter 14, the filtrate storage tank 15, the filtrate pressurized transfer pump 16, and the acidic gas pressurized absorption tower 17.

The above-mentioned method mainly comprises the following steps: the metal salt solution preparation (mainly relating to parts 1-5), the metal salt hydrolysis for preparing the slurry of the hydrates of the metal oxides precipitate (mainly relating to parts 6-14), the slurry filtration (mainly relating to parts 15-16), and the acidic gas absorption for preparing nitric acid solution (mainly relating to parts 17-18).

The following steps are given using Fe as a metal material to illustrate the methods and the related apparatus for preparing the hydrates of metal oxides and metal oxides shown in FIG. 1.

(1) Putting the transition metal materials (in various shapes such as sheets, rods or powder) into the reactor 1 for preparing transition metal salt solution, performing the dissolving reaction using a mixture solution of the nitric acid solution from the bottom of the acidic gas pressurized absorption tower 17 and the nitric acid solution from the acidic gas cooling condenser 10. A certain liquid-level of transition metal solution is accumulated at the bottom of the reactor 1. The concentration of the metal salt is controlled at the outlet of the acid solution recycling pump 5; and a part of the salt solution is stored in the storage tank 3 for later use. The $NO_2$ produced in the reactor 1 and the evaporated water vapor passes through the cooling condenser 2 on the top of the reactor 1, wherein a part of the entrained water vapor is condensed and cooled down to room temperature before introduction to the acidic gas compressor 4, which is transferred to the acidic gas cooling condenser 10 after compression.

(2) The metal salt solution stored in the salt solution intermediate storage tank 3 (if additives are needed, they can be added here) passes through salt solution pressurized transfer pump 6 and mixed with a part of the filtrate from the downstream filtrate pressurized transfer pump 16. The mixture is transferred to the sprayers on the top of the transition metal solution hydrolysis reactor 7 to wash and cool down the uprising hot acidic gas, thus partially condense the water vapor; at the same time, the spray liquid is heated to the hydrolysis temperature and transferred into a mixture of the salt solution and the slurry in the hydrolysis reactor 7 to carry out the hydrolysis reaction. The above reaction produces the hydrates of metal oxides precipitate and acidic gas (main components of the acidic gas are NO, $NO_2$, and $O_2$). The slurry produced in the reactor is recycled via the slurry recycling pump 9, while the temperature of the reactor is controlled by heating the recycled solution with the vapor heater 8; a part of hot slurry is extracted from the recycled solution/slurry and pressurized, which is mixed with the cold slurry from the storage tank 13 and cooled before entering the slurry cooler 11 for further cooling and then transferred into the storage tank 13 for later use.

(3) The cold slurry stored in the storage tank 13 is continuously recycled by the recycling pump 12 and cooled via the water cooled hot slurry cooler 11, a part of the recycled solution is transferred to the plate-and-frame press filter 14 for separating the precipitate product 50 by filtration. The clear solution 51 from the plate-and-frame press filter 14 is transferred to the filtrate storage tank 15 for later use.

(4) The gas liberated from the cold slurry in the storage tank 13 is mixed with that from the filtrate in the storage tank 15, which is transferred to the cooling condenser 2 and used as heat exchange medium for cooling the $NO_2$ gas and evaporated water vapor in the reactor 1. The filtrate 52 from the storage tank 15 is pressurized by the filtrate pressurized transfer pump 16 and transferred to the top of the absorption tower 17 as absorption liquid, which is used to absorb the acidic gas from the cooling condenser 10 thus reduce the acidic gas concentration to ppm level (or meet the national standards on emissions); then the remaining gas is discharged. The liquid which has absorbed acidic gas reaches its maximum nitric acid concentration at the bottom of the absorption tower 17 and is returned to the metal salt solution preparation step for recycling use. Additional one or more absorption towers 17 can be used in series in the above mentioned absorption process in order to improve the recovery rate and to reduce the concentration of $NO_x$ to ppm level or meet the national standards on emissions.

The metal oxides precipitate product is prepared according to the above mentioned the steps (1), (2) and (3). All byproducts recovery and recycling use is accomplished according to the steps (1), (2), (3) and (4). The above-mentioned precipitate product can be used as metal-base FTS catalyst or used for preparing the metal-base FTS catalyst.

The present method effectively integrates the key units of the metal salt preparation, the metal oxides precipitate preparation and acidic gas absorption, wherein the metal oxides precipitate is prepared by thermal decomposition of metal salt solution under pressurized superheated water vapor. The method achieves the recycling use of potential pollutants such as nitric acid and achieves the target of no other nitrates byproduct formation during the preparation of metal oxides or metal oxides catalyst.

The present method uses the pressurized superheated water vapor to heat the metal salt solution, which promotes the metal salt hydrolysis reaction by forming precipitate continuously, which facilitates the forward reaction.

In the present method, other necessary components such as catalyst additives can be added before the hydrolysis of the metal salt solution in order to prepare the desired metal oxides precursors or end products for different applications.

The present method controls the process of the metal salt solution reaction and the characteristics of the precipitate by diluting the metal salt solution; the above-mentioned characteristics can also be controlled via the control of the temperature and pressure of the introduced water vapor, and certainly a small amount of organic acid can be added to control the characteristics of the product.

After filtration and drying of the slurry containing the hydrates of metal oxides, hydrates of metal oxides, a mixture of hydrates of metal oxides and metal oxides, or metal oxides material can be obtained; alternatively, metal oxides catalyst can be prepared after drying and shaping or other routine subsequent steps.

More specifically, the method of the present invention is described in combination with FIG. 1 as follows:

i) Putting the transition metal materials (sheets, rods or powder) 19 into reactor 1 for preparing the transition metal salt solution. When nitric acid is used as reaction solvent, a small amount of nitric acid solution 20 for compensation, the nitric acid solution 55 from the bottom of the acidic gas pressurized absorption tower 17 and the nitric acid solution 38 from the acidic gas cooling condenser 10 are mixed to obtain the nitric acid solution 21, the nitric acid solution 21 is further mixed with the acid/salt solution 23 from the acid solution recycling pump 5 to obtain the mixture solution 25, and the mixture solution 25 is transferred into the reactor 1. The mixture solution together with the recycled solution sprayers at the top of the reactor 1 are used to control the dissolution of the metal materials. A certain liquid-level of the transition metal salt solution is accumulated at the bottom of the reactor 1. The concentration of the metal salt solution is controlled at the outlet of the acid solution recycling pump 5, and then extracting a part of the salt solution 24, which is stored in the salt solution intermediate storage tank 3 for later use. The concentration of the nitric acid solution 21 is 10-55 wt %, preferably 20-50 wt %; the reaction temperature is from room temperature to 95° C., preferably from room temperature to 80° C.; the pressure is atmospheric pressure.

ii) The temperature of the solution in the reactor 1 increases due to the heat released by the above-mentioned dissolution reaction. The $NO_2$ produced and the water vapor evaporated pass through the cooling condenser 2 at the top of the reactor 1, a part of the entrained water vapor is condensed, which is further cooled down to room temperature and forms a stream 26; the stream 26 subsequently changes into the compressed acidic gas 27 after being transferred into the acidic gas (i.e. $NO_2$) compressor 4. The compressed acidic gas 27 then mixes with the acidic gas 35 produced in the transition metal salt solution hydrolysis reactor 7 to obtain the compressed acidic gas 36, which is transferred into the acidic gas cooling condenser 10. The pressure of the compressed acidic gas 36 is 3-15 bar.

iii) The metal salt solution 28 stored in the salt solution intermediate storage tank 3 mentioned above (or raw materials solution prepared by adding one or more additives to the salt solution) is pressurized in the pressurized transfer pump 6. The obtained salt solution 29 is transferred to the sprayers at the top of the metal salt solution hydrolysis reactor 7 to condense a part of the water vapor via washing and cooling the upward hot acidic gas, simultaneously the spraying liquid is heated to the hydrolysis temperature and is transferred into the mixture of the salt solution and slurry in the hydrolysis reactor 7, where the hydrolysis reaction of the metal salt performed. Meanwhile, the pressurized air stream 54 is introduced into the reactor. The concentration of the raw materials solution 28 (in weight percent of the metal salt) is 10-50 wt %, preferably 15-45 wt %.

iv) A slurry containing the hydrates of metal oxides precipitate and acidic gas (its main components are NO, $NO_2$ and $O_2$) is produced from the hydrolysis reaction in the previous step; the reaction is an endothermic reaction. Because the reaction can only performed at a certain temperature, the solution inside the hydrolysis reactor 7 is partially heated by directly introducing a pressurized superheated water vapor; the temperature of the pressurized superheated water vapor is 120-260° C., preferably 130-250° C.; the pressure of that is 3-50 bar, preferably 4-40 bar. The rest heat required comes from the hot slurry recycling system consisting of the slurry recycling pump 9 and the vapor heater 8. The temperature of the hydrolysis reactor 7 is 80-250° C., preferably 100-200° C., while the pressure of the hydrolysis reactor 7 is 2-50 bar, preferably 3-40 bar.

v) The acidic gas produced in the hydrolysis reactor 7 as mentioned in iii) is washed and cooled by the downward spraying liquid in the free space at the top of the reactor and subsequently extracted from the hydrolysis reactor 7 as acidic gas 35, which is mixed with the compressed acidic gas 27 from the compressor 4 and transferred to the downstream absorption process.

vi) According to the hot slurry recycling system in iv), the slurry 31 is liberated from the slurry of the precipitate 30 via the slurry recycling pump 9, where a part of the slurry 34 is extracted to control the reaction degree of the decomposition reaction; the rest of the slurry 32 is heated via the vapor heater 8 to obtain the stream 33, and the stream 33 is introduced to the reactor 7 to control the temperature in the reactor. The heat source of the vapor heater 8 is pressurized superheated water vapor, as mentioned above, wherein the temperature of the pressurized superheated water vapor is 130-250° C., with a pressure of 4-40 bar.

vii) The extracted hot slurry 34 as described in vi) is pressurized and subsequently mixed with a part of the cold slurry 42 to cool down to form a stream 43, wherein the cold slurry 42 is obtained by extracting the cold slurry 41 from the cold slurry storage tank 13 followed by pumped with the cold slurry recycling pump 12. The stream 43 enters the top of the hot slurry cooler 11 for further cooling to obtain the stream 44, which is transferred to the cold slurry storage tank 13 for later use. A small amount of air 48 can be introduced into the bottom of the storage tank 13 to further remove the acidic gas in the liquid.

viii) The rest of the cold slurry 45 from the cold slurry recycling pump 12 is transferred to the plate-and-frame press filter 14 to separate the precipitate product 50, while the clear liquid 51 from the plate-and-frame press filter 14 is transferred to the filtrate storage tank 15 for later use.

ix) The liberated gas 49 from the cold slurry in the cold slurry storage tank 13 as described in vi) is mixed with the liberated gas 57 from the filtrate storage tank 15 as described in vii) to form a stream 58, the mixture is transferred to the cooling condenser 2 and used as heat exchange medium to cool down the produced $NO_2$ gas and evaporated water vapor in the reactor 1.

x) The compressed acidic gas 36 as mentioned in ii) is cooled in the cooling condenser 10 to obtain the nitric acid solution 38, with the remaining acidic gas 37 fed into the bottom of the absorption tower 17 to prepare the nitric acid via low temperature spraying. As mentioned in vii), the filtrate 52 in the storage tank 15 is pressurized by the filtrate pressurized transfer pump 16 to obtain filtrate 53, the filtrate 53 is sent to the top of the absorption tower 17 to be used as absorption liquid. The nitric acid concentration reaches a maximum at the bottom of the absorption tower 17 after acidic gas is absorbed in the liquid; this nitric acid solution 55 is returned to the metal salt preparation step for recycling use, the acidic gas is bubbled through the absorption tower 17 to reduce the content for the acidic gas to ppm level; afterwards the remaining air component 56 is discharged. If necessary, the above-mentioned absorption process can be connected in series with one or more absorption towers to enhance the absorption efficiency in order to meet the requirement that the acidic gas content should be lower than ppm level for gas releasing from the absorption tower 17. The temperature for the acid preparation reaction inside the absorption tower 17 is 3-50° C., preferably 10-40° C., wherein the pressure ranges from 2-20 bar, preferably 3-15 bar.

When the prepared catalyst is a FTS catalyst, the metal oxides precipitate product can be prepared according to the steps of i) to x), wherein any patented techniques for the precipitated FTS catalyst can be adopted for additives introduction, shaping, drying and roasting to prepare the final product of the FTS catalyst. Preferably, the previously applied patented techniques for catalyst preparation of the applicant can be used.

EXAMPLES

Further details are provided by the specific examples to illustrate the technical solutions of the present invention, without limiting the scope of the present invention by any means.

Example 1

In the metal salt solution preparation reactor, Fe powder and Mn powder are mixed in a ratio of Fe:Mn=100:18 (wt), the mixture of Fe and Mn is dissolved using a 35 wt % nitric acid from the absorption tower; then a metal nitrate solution with a concentration of 25.5 wt % is obtained, into which an appropriate amount of alumina sol is added.

Then, the decomposition reaction inside the metal salt solution decomposition reactor is carried out at the presence of pressurized superheated water vapor (wherein the pressurized superheated water vapor has a temperature of 140° C. and a pressure of 4.6 bar), wherein the reaction temperature is 120° C. and the pressure is 6 bar; and a brown black precipitate slurry is prepared.

The $NO_2$ gas produced is collected and recovered by the compression system, which is transferred into the acidic gas absorption tower for spraying absorption by using the filtrate obtained from the slurry filtration as the absorption liquid, and 35 wt % nitric acid is obtained and reused as solvent raw materials in the metal salt solution preparation.

The above-mentioned slurry is filtrated to obtain a filter cake with 38 wt % solid content (solid content percent). The filter cake is the hydrates of Fe oxides and Mn oxides, and the cake is prepared into slurry, and then add dissolved potassium carbonate in a Fe:K ratio of 100:3 (wt); The Fe—Mn catalyst for FTS is obtained after spray drying and roasting.

Example 2

In the reactor for preparing the transition metal salt solution, the block shaped Fe, Cu and Zn in a ratio of Fe:Cu:Zn=100:6:8 (wt) are dissolved by using a 48 wt % nitric acid from the absorption tower, thereby a metal nitrate solution with a concentration of 37.7 wt % is prepared.

The thermal decomposition reaction inside the metal salt solution decomposition reactor is carried out with the presence of pressurized superheated water vapor (wherein the pressurized superheated water vapor has a temperature of 230° C. and a pressure of 28 bar), wherein the reaction temperature is 190° C. and the pressure is 15 bar; then a brown-red precipitate slurry is prepared. A filter cake with a solid content of 27.3 wt % is obtained after filtering the slurry.

The $NO_2$ gas collected is recovered by the compression system (the pressure is 3 bar), which is transferred to the acidic gas absorption tower for spraying absorption by using the filtrate obtained from the slurry filtration as absorption liquid. A 48 wt % of nitric acid is obtained and reused as solvent raw materials in the metal salt solution preparation.

The filter cake is prepared into slurry and then used to prepare potassium silicates according to a Fe:K:$SiO_2$ ratio of 100:4:18 (wt). The product is spray dried and roasted to obtain the Fe—Cu catalyst for FTS.

The properties of the catalysts obtained from the above-mentioned examples are listed in the following Table 1:

TABLE 1

| Examples | Catalyst | Specific Surface Area ($m^2/g$) | Pore Volume ($cm^3/g$) | Bulk Density ($g/cm^3$) |
|---|---|---|---|---|
| 1 | Fe—Mn | 154 | 0.28 | 1.21 |
| 2 | Fe—Cu | 98 | 0.36 | 1.05 |

Embodiments of the present invention have been described in detail hereinbefore. For the skilled in the art, it is obvious that many modifications and improvements can be done without departing from the basic spirits of the present invention. All of these modifications and improvements are included in the scope of the present invention.

What is claimed is:

1. A method for preparing a metal oxides catalyst, the method is characterized by the following method:
   (a) dissolving one or more kinds of metal materials in nitric acid solution to produce a metal nitrate solution, and also to produce NOx and water vapor;
   (b) introducing pressurized superheated water vapor into the obtained metal nitrate solution to perform hydrolysis to obtain acidic gas and a slurry of hydrates of metal oxides, wherein main components of the acidic gas are $NO_2$, NO, $O_2$ and water vapor;
   (c) filtering the slurry of hydrates of metal oxides to obtain the hydrates of metal oxides and a filtrate and drying the hydrates of metal oxides to obtain the corresponding hydrates of metal oxides and/or metal oxides; and
   (d) using the hydrates of metal oxides and/or metal oxides as raw materials to prepare a metal oxides catalyst.

2. The method according to claim 1, wherein the metal salt solution preparation step of the step (a) is performed under atmospheric pressure at a temperature range from room temperature to 95° C. to obtain the metal nitrate solution together with $NO_x$ and water vapor;
   wherein the concentration of the nitric acid solution added is 10-55 wt %, and the concentration of the produced nitrate solution is 10-50 wt %;

wherein the metal salt solution hydrolysis step of the step (b) is to introduce the pressurized superheated water vapor into the reactor to hydrolyze the obtained metal nitrate solution from the step (a) at a reaction temperature of 80-250° C. with a pressure of 2-50 bar; acidic gas and a slurry of hydrates of metal oxides are produced, and main components of the acidic gas are $NO_2$, NO, $O_2$ and water vapor; wherein the temperature of the pressurized superheated water vapor introduced is 120-260° C. and the pressure thereof is 3-50 bar; and/or wherein the product preparation step of the step (c) is to subject the slurry obtained from the step (b) to treatments including pressurizing, cooling and acidic gas removing, and then the slurry is separated by filtrating to obtain the filtrate and the hydrates of metal oxides precipitate; the solid content of the hydrates of metal oxides precipitate is 10-50 wt %; the desired hydrates of metal oxides and/or metal oxides are obtained after drying the precipitate.

3. The method according to claim 2, wherein the preparation method of the hydrates of metal oxides and/or metal oxides comprises the following steps:
(a) dissolving one or more kinds of metal materials in a nitric acid solution in a reactor under atmospheric pressure at a reaction temperature from room temperature to 80° C. to obtain the metal nitrate solution together with $NO_2$ and water vapor; wherein the concentration of the nitric acid solution used is 20-50 wt % and the concentration of the metal nitrate solution produced is 15-45 wt %;
(b) introducing the pressurized superheated water vapor with a temperature of 130-250° C. and a pressure of 4-40 bar into the reactor of the metal salt solution hydrolysis reaction, in which the hydrolysis reaction of the metal nitrate solution obtained from the step (a) is performed; the reaction temperature is 100-200° C. and the pressure is 3-25 bar; the slurry of hydrates of metal oxides precipitate together with acidic gas are produced, and main components of the acidic gas are $NO_2$, NO, $O_2$ and water vapor; and
(c) subjecting the slurry obtained from the step (b) to treatments including pressurizing, cooling and acidic gas removing, and then the slurry is separated by filtrating to obtain a filter cake containing hydrates of metal oxides precipitate and filtrate, the solid content of the hydrates of metal oxides precipitate ranges from 15 to 45 wt %; the desired hydrates of metal oxides and/or metal oxides are obtained after drying the precipitate.

4. The method according to claim 3, wherein the obtained metal oxides are prepared into metal oxides nano-powder or any other suitable forms for preparing the metal oxides catalyst.

5. The method according to claim 1, wherein the metal materials are one or more kinds of transition metals selected from the group consisting of V, Cr, Mn, Fe, Co, Ni, Cu, Y, Zr, Nb, Mo, Ag, La and Ce, and the metal materials are materials in sheets, rods or powder forms.

6. The method according to claim 1, characterized in that the preparation method of the hydrates of metal oxides and/or metal oxides further comprises nitric acid preparation and recycling use step.

7. The method according to claim 6, wherein the nitric acid preparation and recycling use step includes:
collecting the gas produced from the metal salt solution preparation step and the acidic gas from the metal salt solution hydrolysis step, then compress the $NO_2$ component and absorb the same in the absorption tower to obtain a nitric acid solution; or collecting the gas from the metal salt solution preparation step and the acidic gas from the metal salt solution hydrolysis step, followed by compression and condensation to obtain an acid solution, and the acid solution is returned to the metal salt solution preparation step for recycling use; the $NO_2$ contained in the uncondensed gas is absorbed by absorption liquid in the absorption tower to obtain a nitric acid solution, wherein the absorption liquid is the filtrate from the filtrating separation of the hydrates of metal oxides precipitate; the nitric acid solution obtained is returned to the metal salt solution preparation step for recycling use.

8. The method according to claim 7, wherein the acidic gas absorption in the absorption tower to make nitric acid is performed at a temperature of 10-40° C. and a pressure of 3-15 bar.

9. The method according to claim 7, wherein the slurry of hydrates of metal oxides is filtered in the product preparation step (c) to obtain the hydrates of metal oxides precipitate and the filtrate, and a part of the obtained filtrate is reused as raw materials of the metal salt solution hydrolysis step; and another part of the obtained filtrate is used as absorption liquid for $NO_2$ absorption to make nitric acid.

10. The method according to claim 7, wherein the acidic gas absorption in the absorption tower to make nitric acid is performed at a temperature of 3-50° C. and a pressure of 2-20 bar.

11. The method according to claim 7, wherein the nitric acid solution used in the metal salt solution preparation step (c) includes:
(i) the acid solution obtained by compression and condensation of the gas from the metal salt solution preparation step and the acidic gas from the metal salt solution hydrolysis step;
(ii) the nitric acid prepared by absorbing $NO_2$ in the absorption tower with the absorption liquid, the $NO_2$ is contained in the uncondensed gas after the compression and condensation of the gas from the metal salt solution preparation step and the acidic gas from the metal salt solution hydrolysis step; and
(iii) fresh nitric acid added to compensate an insufficient of nitric acid.

12. The method according to claim 1, wherein the method further comprises:
adding a catalyst additive to the metal nitrate solution obtained from the step (a), followed by subsequent steps to prepare the catalyst; or
when the hydrates of metal oxides obtained from the filtrating separation of the slurry of hydrates of metal oxides in step (c) is in the form of a filter cake, the method for preparing the catalyst further includes directly drying and shaping of the filter cake into the catalyst, or preparing the filter cake into a slurry again and adding the catalyst additive to prepare the catalyst by drying and shaping.

13. The method according to claim 12, wherein the catalyst is a Fischer Tropsch synthesis catalyst.

14. The method according to claim 12, wherein the catalyst additive is alumina sols, silica sols, organosilicons, molecular sieves, organic acids or inorganic salts and wherein the inorganic salts include nitrates or carbonates of IA and IIA metals.

15. The method according to claim 1, wherein the metal materials are one or more kinds of transition metals selected from the group consisting of Cr, Mn, Fe, Co, Ni, Cu, Zr, Nb and Mo, and the metal materials are materials in sheets, rods or powder forms.

* * * * *